Figure 1:
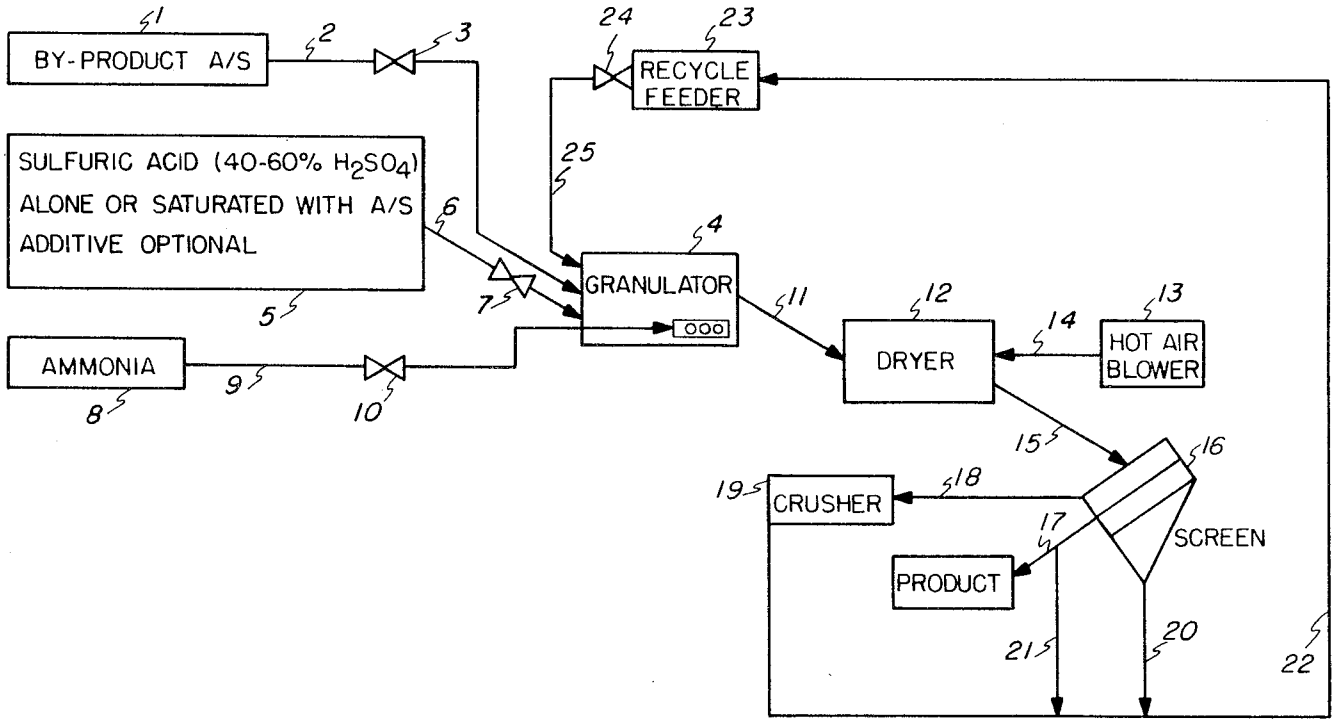
Figure 2:
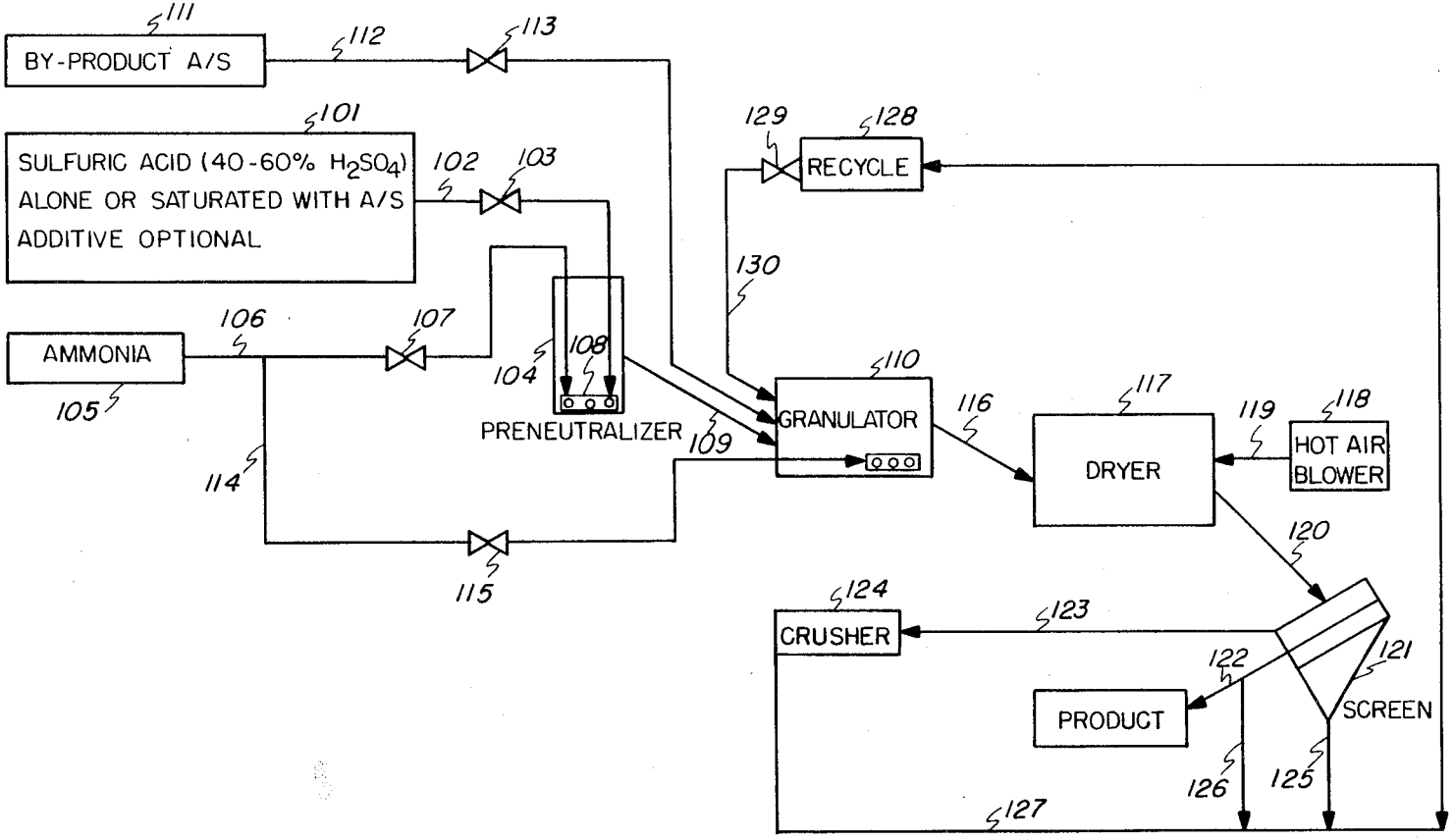

United States Defensive Publication [19] (H) [11] T105,501

Harrison et al. [43] Jun. 4, 1985

[54] GRANULATION OF CRYSTALLINE BY-PRODUCT AMMONIUM SULFATE

[76] Inventors: Cecil P. Harrison, Rte. 13, Box 41, Florence, Ala. 35630; Cullen G. Tittle, 109 Monroe Dr., Tuscumbia, Ala. 35674

[21] Appl. No.: 654,278

[22] Filed: Sep. 25, 1984

[51] Int. Cl.[3] ..... C05B 3/00

[52] U.S. Cl. ..... 71/61; 71/64.05; 71/64.06

[57] ABSTRACT

The present invention teaches a simple method for reclaiming principally the N and S values in by-product, fine, crystalline ammonium sulfate in a granular form eminently suitable for the preparation of direct application fertilizers and/or the incorporation into bulk-blending operations for the preparation thereof.

In the instant invention, normally from about seventy (70) percent to about eighty (80) percent of the ammonium sulfate product produced therefrom, is derived from feedstock comprising said by-product, fine, crystalline ammonium sulfate. Furthermore, in one embodiment for the practice of the instant invention, from about eighty (80) percent to about eighty-eight (88) percent of said fine, crystalline ammonium sulfate feedstock is directly incorporated thereinto with the remainder thereof being indirectly introduced thereinto by means of applicants' prepared special "binder." In another embodiment for the practice of the instant invention wherein same is effected juxtaposed an ammonium sulfate crystallizer unit the aqueous saturated ammonium sulfate mother liquor removed therefrom, with and/or without slurry fines therein may be admixed with water and sulfuric acid to prepare the binder solution for subsequent introduction into the inclined rotating drum. In this embodiment for the practice of the instant invention, all of the fine, crystalline ammonium sulfate feedstock may be directly incorporated into the upper end of said inclined rotating drum, i.e., by acidifying the mother liquor from the crystallizer it is not necessary to employ desolution of a sidestream of the by-product fines from the stockpile thereof.

7 Claims, 2 Sheets Drawing,

28 Pages Specification

The file of this unexamined application may be inspected and copies thereof may be purchased (849 O.G. 1221, Apr. 9, 1968).

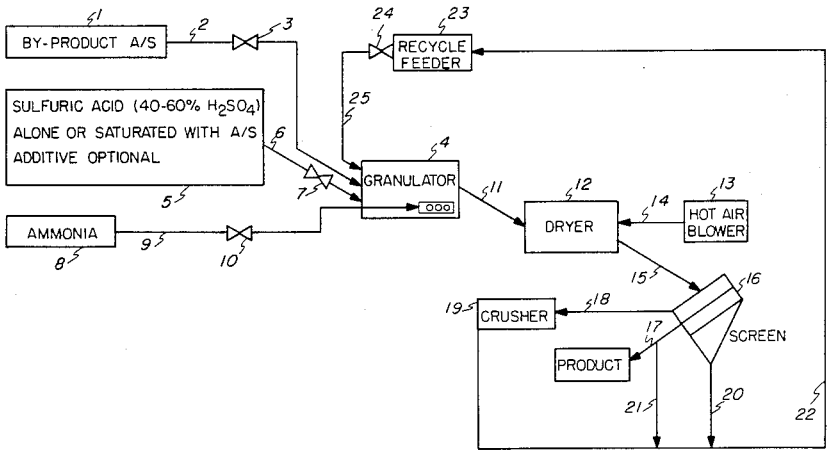

GRANULATION OF BY-PRODUCT A/S

GRANULATION OF BY-PRODUCT A/S

GRANULATION OF BY-PRODUCT A/S